United States Patent
Kupratis et al.

(10) Patent No.: US 12,071,903 B2
(45) Date of Patent: Aug. 27, 2024

(54) ASSISTED ENGINE START BLEED SYSTEM

(71) Applicant: Raytheon Technologies Corporation, Farmington, CT (US)

(72) Inventors: Daniel Bernard Kupratis, Wallingford, CT (US); Martin Richard Amari, Glastonbury, CT (US); Geoffrey T. Blackwell, Vernon, CT (US)

(73) Assignee: RTX Corporation, Farmington, CT (US)

( * ) Notice: Subject to any disclaimer, the term of this patent is extended or adjusted under 35 U.S.C. 154(b) by 361 days.

(21) Appl. No.: 16/864,881

(22) Filed: May 1, 2020

(65) Prior Publication Data
US 2021/0199056 A1 Jul. 1, 2021

Related U.S. Application Data

(60) Provisional application No. 62/842,024, filed on May 2, 2019.

(51) Int. Cl.
*F02C 9/18* (2006.01)
*F02C 7/26* (2006.01)

(52) U.S. Cl.
CPC .............. *F02C 9/18* (2013.01); *F02C 7/26* (2013.01); *F05D 2240/127* (2013.01); *F05D 2260/606* (2013.01); *F05D 2260/85* (2013.01)

(58) Field of Classification Search
CPC .... F02C 6/08; F02C 7/047; F02C 7/26; F02C 9/18; B01D 53/00; B01D 53/005;
(Continued)

(56) References Cited

U.S. PATENT DOCUMENTS 2,644,315 A * 7/1953 Holmes ............... F25B 9/04
62/190
2,786,341 A * 3/1957 Green ................. F25B 9/04
96/306
(Continued)

FOREIGN PATENT DOCUMENTS

EP 1041290 A2 10/2000
WO 2018012100 A1 1/2018

OTHER PUBLICATIONS

EP Search Report dated Oct. 12, 2020 issued for corresponding European Patent Application No. 20172625.4.
(Continued)

*Primary Examiner* — Woody A Lee, Jr.
*Assistant Examiner* — Justin A Pruitt
(74) *Attorney, Agent, or Firm* — Bachman & LaPointe, P.C.

(57) ABSTRACT

A system for bleeding air from a core flow path of a gas turbine engine includes a bleed valve in a bleed air duct configured to receive bleed air from a first entrance point to the core flow path into the bleed air duct; a pressurized air valve in a pressurized air duct configured to receive pressurized air from a second entrance point to the core flow path, the pressurized air at a pressure greater than that received into the first entrance point; an eductor outlet from the pressurized air duct located in the bleed air duct; and a control system operable to control operation of the bleed valve and the pressurized air valve.

18 Claims, 5 Drawing Sheets

(58) Field of Classification Search
CPC ................ B01D 53/24; B01D 2259/4575; B64D 15/04; F05D 2240/127; F05D 2260/209; F05D 2260/606; F05D 2260/85
USPC .................. 415/145; 95/31, 32, 34
See application file for complete search history.

(56) References Cited

U.S. PATENT DOCUMENTS

| | | | | |
|---|---|---|---|---|
| 2,839,898 | A * | 6/1958 | Green | F25B 9/04 62/133 |
| 2,839,900 | A * | 6/1958 | Green | F25B 9/04 62/241 |
| 2,839,901 | A * | 6/1958 | Green | F25B 9/04 62/305 |
| 3,026,681 | A * | 3/1962 | Green | B64D 13/06 62/402 |
| 3,361,336 | A * | 1/1968 | Foa | F25B 9/04 417/406 |
| 3,973,396 | A * | 8/1976 | Kronogard | F02C 7/18 60/806 |
| 4,333,754 | A * | 6/1982 | Peter | F25B 9/04 181/403 |
| 6,328,526 | B1 | 12/2001 | Seki et al. | |
| 6,644,012 | B2 * | 11/2003 | Hoffmann | F01K 23/10 60/726 |
| 7,143,573 | B2 * | 12/2006 | Hoffmann | F02C 7/18 60/785 |
| 7,246,482 | B2 | 7/2007 | Mahoney et al. | |
| 8,099,966 | B2 * | 1/2012 | Mossberg | B64D 13/08 62/239 |
| 8,955,334 | B2 | 2/2015 | Hansen et al. | |
| 9,611,752 | B2 | 4/2017 | Tillery et al. | |
| 9,822,662 | B2 * | 11/2017 | Marsh | F02C 6/08 |
| 10,100,744 | B2 | 10/2018 | Mackin et al. | |
| 10,125,724 | B2 | 11/2018 | Roberge et al. | |
| 10,670,473 | B2 * | 6/2020 | Costello | B64D 15/04 |
| 10,724,443 | B2 * | 7/2020 | Hon | F01D 25/34 |
| 11,067,007 | B2 * | 7/2021 | Kitaguchi | F02C 7/26 |
| 2013/0327012 | A1 | 12/2013 | Mahabub et al. | |
| 2015/0322866 | A1 | 11/2015 | Scipio et al. | |
| 2019/0055889 | A1 | 2/2019 | Heims et al. | |
| 2019/0153963 | A1 * | 5/2019 | Kitaguchi | F02C 7/26 |

OTHER PUBLICATIONS

EP Office Action dated Aug. 5, 2022 issued for corresponding European Patent Application No. 20172625.4.

* cited by examiner

ASSISTED ENGINE START BLEED SYSTEM

CROSS REFERENCE TO RELATED APPLICATION

This application claims the benefit of provisional application Ser. No. 62/842,024, filed May 2, 2019.

BACKGROUND

The present disclosure relates to a start system for a gas turbine engine and, more particularly, to a bleed system to facilitate start thereof.

Gas turbine engines, such as those which power modern commercial and military aircraft, include a compressor section, combustor section and turbine section arranged longitudinally around the engine centerline so as to provide an annular gas flow path. The compressor section compresses incoming atmospheric gases that are then mixed with a combustible fuel product and burned in the combustor section to produce a high energy exhaust gas stream. The turbine section extracts power from the exhaust gas stream to drive the compressor section. The exhaust gas stream produces forward thrust as it rearwardly exits the turbine section. Some engines may include a fan section, which is also driven by the turbine section, to produce bypass thrust. Downstream of the turbine section, a military engine may include an augmentor section, or "afterburner", that is operable to selectively increase the thrust. The increase in thrust is produced when fuel is injected into the core exhaust gases downstream of the turbine section and burned with the oxygen contained therein to generate a second combustion.

At start-up, the turbine section of the gas turbine engine has yet to fully provide power. Thus, driving the compressor section may be more challenging than it will generally be at steady state or design conditions. Accordingly, gas turbine engines may include one or more bleed valves to bleed air away from the core flow path during start-up to thereby reduce the load required to drive the compressor.

SUMMARY

A system for bleeding air from a core flow path of a gas turbine engine according to one disclosed non-limiting embodiment of the present disclosure includes a bleed valve in a bleed air duct configured to receive bleed air from a first entrance point to the core flow path into the bleed air duct; a pressurized air valve in a pressurized air duct configured to receive pressurized air from a second entrance point to the core flow path, the pressurized air at a pressure greater than that received into the first entrance point; an eductor outlet from the pressurized air duct located in the bleed air duct; and a control system operable to control operation of the bleed valve and the pressurized air valve.

A further aspect of the present disclosure includes, wherein the bleed air duct is of a larger diameter than the pressurized air duct.

A further aspect of the present disclosure includes, wherein the controller is a FADEC.

A further aspect of the present disclosure includes, wherein the first entrance point is positioned proximate a compressor section of the gas turbine engine.

A further aspect of the present disclosure includes, wherein the first entrance point is positioned proximate a low pressure compressor section of the gas turbine engine.

A further aspect of the present disclosure includes, wherein the first entrance point is positioned upstream of a low pressure compressor section of the gas turbine engine.

A further aspect of the present disclosure includes, wherein the second entrance point is positioned proximate a high pressure compressor section of the gas turbine engine.

A further aspect of the present disclosure includes, wherein the second entrance point is positioned downstream of a high pressure compressor section of the gas turbine engine.

A further aspect of the present disclosure includes, wherein the second entrance point is positioned proximate a P3 location within the gas turbine engine.

A further aspect of the present disclosure includes a vortex tube in communication with the pressurized air duct.

A further aspect of the present disclosure includes an anti-ice system in communication with the vortex tube.

A gas turbine engine, according to one disclosed non-limiting embodiment of the present disclosure includes a core flow path extending through the gas turbine engine; a bleed valve in a bleed air duct configured to receive bleed air from a first entrance point proximate a low pressure compressor section in the core flow path into the bleed air duct; a pressurized air valve in a pressurized air duct configured to receive pressurized air from a second entrance point proximate to a high pressure compressor section in the core flow path, the pressurized air at a pressure greater than that received into the first entrance point; an eductor outlet from the pressurized air duct located in the bleed air duct; and a control system operable to control operation of the bleed valve and the pressurized air valve.

A further aspect of the present disclosure includes, wherein the bleed air duct is of a larger diameter than the pressurized air duct.

A further aspect of the present disclosure includes a vortex tube in communication with the pressurized air duct.

A method for starting a gas turbine engine according to one disclosed non-limiting embodiment of the present disclosure includes rotating a core spool which drives air through a core flow path; opening a bleed valve in a bleed air duct that is in communication with the core flow path at a first entrance point; opening a pressurized air valve in a pressurized air duct that is in communication with the core flow path at a second entrance point downstream of the first entrance point; and communicating pressurized air from an eductor outlet from the pressurized air duct into the bleed air duct A further aspect of the present disclosure includes communicating the pressurized airflow through a vortex tube in communication with the pressurized air duct.

A further aspect of the present disclosure includes communicating airflow from the vortex tube to an anti-ice system.

A further aspect of the present disclosure includes, wherein the first entrance point is positioned upstream of a low pressure compressor section of the gas turbine engine.

A further aspect of the present disclosure includes, wherein the second entrance point is positioned proximate a high pressure compressor section of the gas turbine engine.

A further aspect of the present disclosure includes, wherein the second entrance point is positioned proximate a P3 location within the gas turbine engine.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
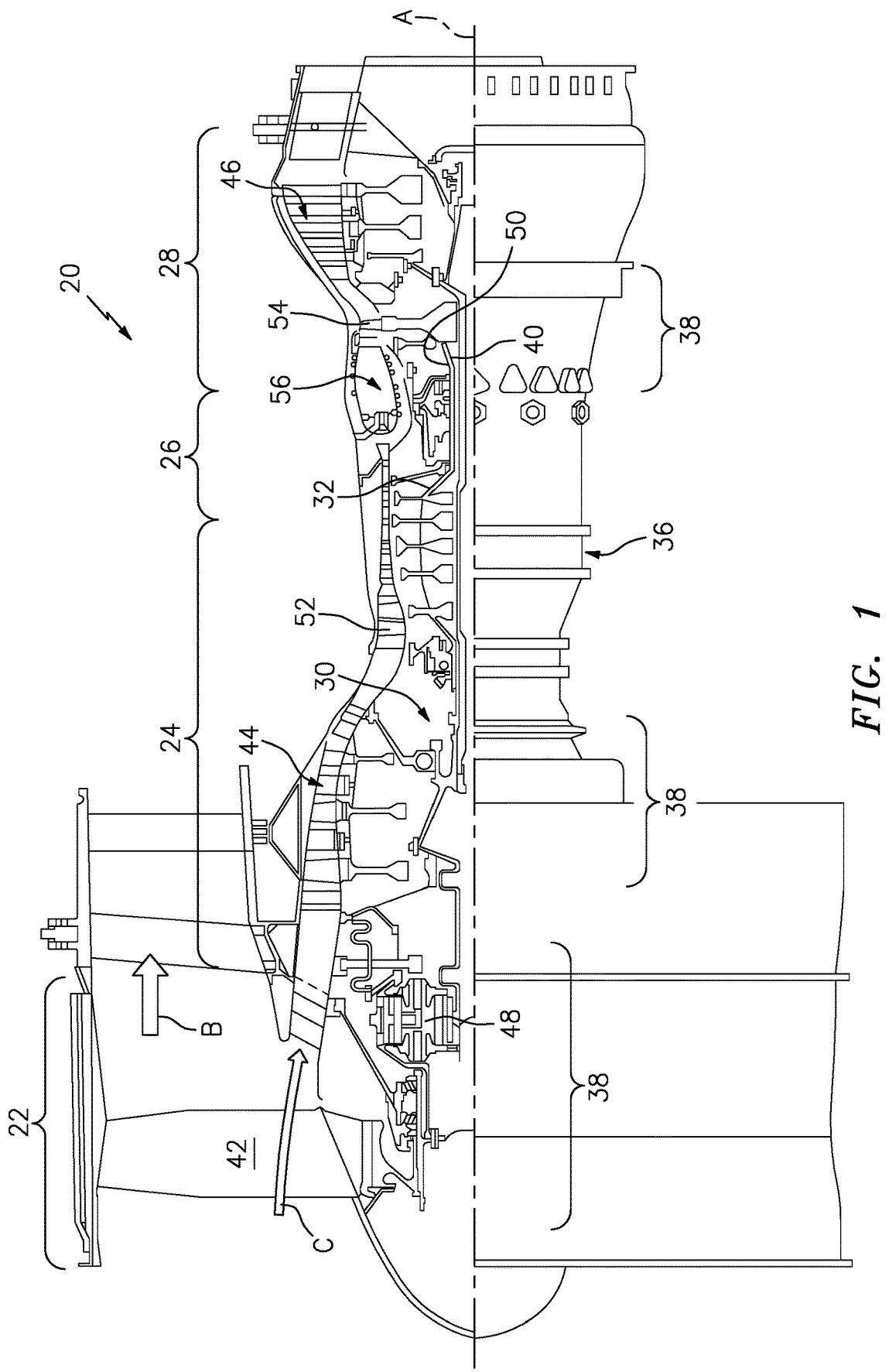
FIG. 1 is a schematic cross-section of an example gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. The fan section 22 drives air along a bypass flowpath "B" while the compressor section 24 drives air along a core flowpath "C" for compression and communication into the combustor section 26, then expansion through the turbine section 28. Although depicted as a turbofan in the disclosed non-limiting embodiment, it should be appreciated that the concepts described herein may be applied to other engine architectures such as turbojets, turboshafts, and three-spool (plus fan) turbofans.

The engine 20 generally includes a low spool 30 and a high spool 32 mounted for rotation about an engine central longitudinal axis A relative to an engine static structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 that drives the fan 42 at a lower speed than the low spool 30. An exemplary reduction transmission is an epicyclic transmission, such as a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44, then the HPC 52, mixed with the fuel and burned in the combustor 56, then expanded over the HPT 54 and the LPT 46 which rotationally drive the respective high spool 32 and the low spool 30 in response to the expansion. The shafts 40, 50 are supported at a plurality of points by bearings 38 within the static structure 36.

Figure 2:
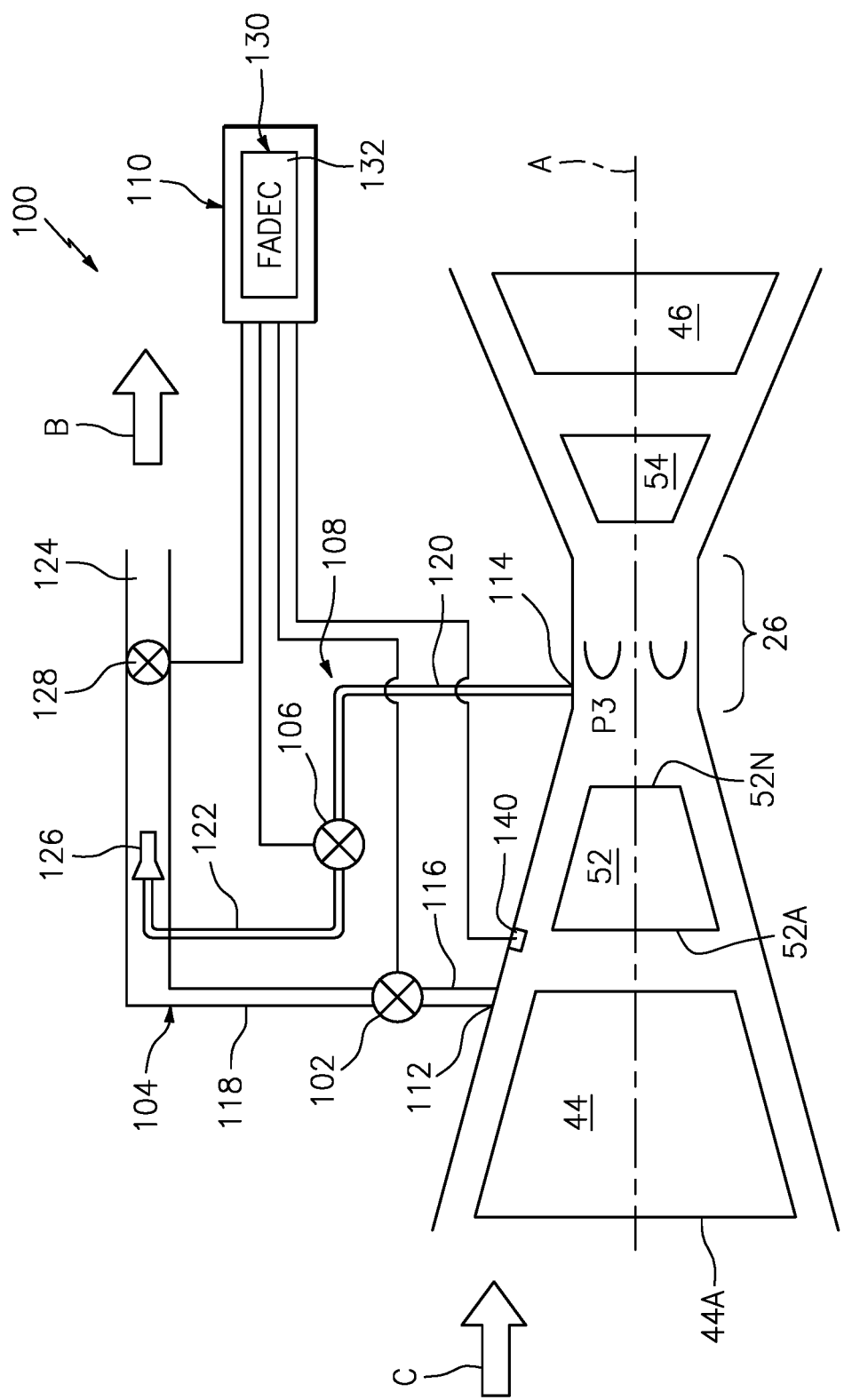
FIG. 2 is a schematic of a system for bleeding air from a core flow path of the gas turbine engine according to one disclosed non-limiting embodiment.

With reference to FIG. 2, a system 100 for bleeding air from a core flow path C of the gas turbine engine 20 includes a bleed valve 102 in a bleed duct 104, a pressurized air valve 106 in a pressurized air duct 108, and a controller 110. The bleed duct 104 receives bleed air from a first entrance point 112 to the core flow path C. The pressurized air duct 108 receives pressurized air at a pressure greater than that received into the bleed duct 104 from a second entrance point 114 to the core flow path C downstream of the first entrance point 112.

The core flow path C includes the low pressure compressor ("LPC") 44 and the high pressure compressor ("HPC") 52. In various embodiments, the compressor section 24 may include one or more compressor stages (each stage including a rotor section and a stator section). The first entrance point 112 to the core flow path C is positioned proximate the low pressure compressor ("LPC") 44, and more specifically, proximate a stage 52A of the high pressure compressor ("HPC") 52. In one embodiment, the second entrance point 114 is configured to receive the pressurized air proximate a final stage 52N of the high pressure compressor ("HPC") 52. In one embodiment, the HPC 52 is a centrifugal compressor and the first entrance point 112 is from the shrouded section of the impeller and more specifically aft of the entrance to the impeller inducer, and the second entrance point 114 is configured downstream of the impeller and upstream of the centrifugal compressor diffuser section. The centrifugal compressor diffuser section may include swirling vanes or an array of pipes circumferentially surrounding the impeller discharge. In another embodiment, the HPC 52 is a multi-stage axial compressor and the first entrance point 112 is between the first and second stages, and the second entrance point 114 is configured at least one more stage downstream of the second stage and proximate the exit of the one more downstream stage. The locations of the first and second entrance points optimally result in a choked flow condition at the eductor outlet 126 within the bleed duct 104. A nearly-choked flow condition means the air pressure at the second entrance point 114 is about one and one-half times the air pressure of the first entrance point 112. A choked flow condition means the air pressure at the second entrance point 114 is about two times the air pressure of the first entrance point 112. In one embodiment the HPC 52 is a multi-stage axial compressor and the first entrance point 112 is from between the first and second stages and the second entrance point 114 is configured at least two more stages downstream of the second stage and proximate the exit of the fourth stage. In one embodiment the HPC 52 is a multi-stage axial compressor and the first entrance point 112 is from between the second and third stages and the second entrance point 114 is configured at least two more stages downstream of the second stage and proximate the exit of the fifth stage.

The change in the enthalpy of the core flow C imparted by each stage of the multi-stage axial compressor HPC 52 is substantially the same. As the temperature of the core flow C increases by passing through each successive stage, the stage pressure ratio of each successively aftward stage of the HPC 52 decreases and more stages are needed between the first entrance point 112 and the second entrance point 114 to result in a choked flow condition at the eductor outlet 126 within the bleed duct 104. In another embodiment the HPC 52 is a multi-stage axial compressor and the first entrance point 112 is from between the second and third stages and the second entrance point 114 is configured at least three more stages downstream of the second stage and proximate the exit of the sixth stage. In another embodiment the HPC 52 is a multi-stage axial compressor and the first entrance point 112 is from between the third and fourth stages and the second entrance point 114 is configured at the exit of the last stage 52N of the HPC 52. Locating the first entrance point 112 and the second entrance point 114 more aftward in the HPC 52 increases the density of the air flows in the bleed duct 104 and the pressurized air duct 108 and reduces the cross-sectional areas of the ducts. Locating the first entrance point 112 and the second entrance point 114 more aftward in the HPC 52 increases the temperature of the air flows in the bleed valve outlet 118 and the pressurized valve outlet 122. An increase to the temperature of the air flows reduces the flow Mach number of the air flows and increases heat transfer from the airflows and reduces pressure losses in the bleed duct 104 and the pressurized air duct 108. Reducing the flow Mach number of the air flows and increasing heat transfer out from the air flows reduces the frictional and thermodynamic (also known as Rayleigh flow) pressure losses in the bleed duct 104 and the pressurized air duct 108.

The second entrance point 114 is positioned downstream of the first entrance point 112 at a relatively higher pressure location along the core flow path C. In one example, the second entrance point 114 may be located proximate an outer annular plenum of the combustor section 26 that operates at a pressure of approximately 500 psia (3447 kPa) and is referred to herein as P3. For example, P1 represents a pressure in front of the fan section 22; P2 represents a pressure at the leading edge of the fan 42; P2.5 represents the pressure aft of the LPC 44; P3 represents the pressure aft of the HPC 52; P4 represents the pressure in the combustion chamber 66; P4.5 represents the pressure between the HPT 54 and the LPT 46; and P5 represents the pressure aft of the LPT 46.

The bleed valve 102 includes a bleed valve inlet 116 and a bleed valve outlet 118 in the bleed duct 104. The pressurized air valve 106 includes a pressurized inlet 120 and a pressurized valve outlet 122 in the pressurized air duct 108. The bleed duct 104 includes an outlet 124 into the bypass flowpath "B" and the pressurized air duct 108 includes an eductor outlet 126 within the bleed duct 104. One preferred location of bleed valve 102 is proximate to the first entrance point 112. Optionally, valve 128 in outlet 124 can functionally supplement or substitute for bleed valve 102. Together, valve 102 is a gate valve with low pressure losses and valve 128 is a pressure throttling valve that controls the flow in outlet 124. In the embodiment shown in FIG. 2 the pressurized air valve 106 is proximate to the second entrance point 114. Optionally, valve 128 in outlet 124 can be supplementary to bleed valve 106. Together, valve 106 is a gate valve with low pressure losses and valve 128 is a throttling valve that controls the flow in outlet 124. In the embodiment shown in FIG. 2 the pressurized air valve 106 can be proximate to the eductor and this placement reduces the length of ducting of the pressurized valve outlet 122. In the embodiment shown in FIG. 4 the pressurized air valve 106 must be upstream of the vortex tube 400 to regulate the heating and cooling capacity of the vortex tube by changing the pressure at the inlet to the vortex tube. Changing the pressure at the inlet to the vortex tube 400 changes the temperature difference between eductor outlet 126 and the inlet to the Anti ice unit 406.

The eductor outlet 126 is essentially a type of pump which works on the venturi effect to facilitate pumping air through the bleed duct 104. The eductor outlet 126 requires only the motive fluid of the higher pressure air from the second entrance point 114 for operation. In one example, the bleed duct 104 is of a larger diameter (e.g., 3-4 inches) than the diameter the pressurized air duct 108 (e.g., 1-2 inches) which facilitates system installation and reduced weight.

The controller 110 generally includes a control module 130 that executes logic 132 (FIG. 5) to control operation of the bleed valve 102 and the pressurized air valve 106 to provide a stable sub-idle initial condition of air flow rate during engine starting. The functions of the logic 132 are disclosed in terms of functional block diagrams, and it should be appreciated that these functions may be enacted in either dedicated hardware circuitry or programmed software routines capable of execution in a microprocessor-based electronics control embodiment. In one example, the control module 130 may be a portion of a flight control computer, a portion of a Full Authority Digital Engine Control (FADEC), a stand-alone unit, or other system. The control module 130 may also communicate with a pressure sensor 140 that is used to control opening and closing of the bleed valve 102 and the pressurized air valve 106.

Figure 3:
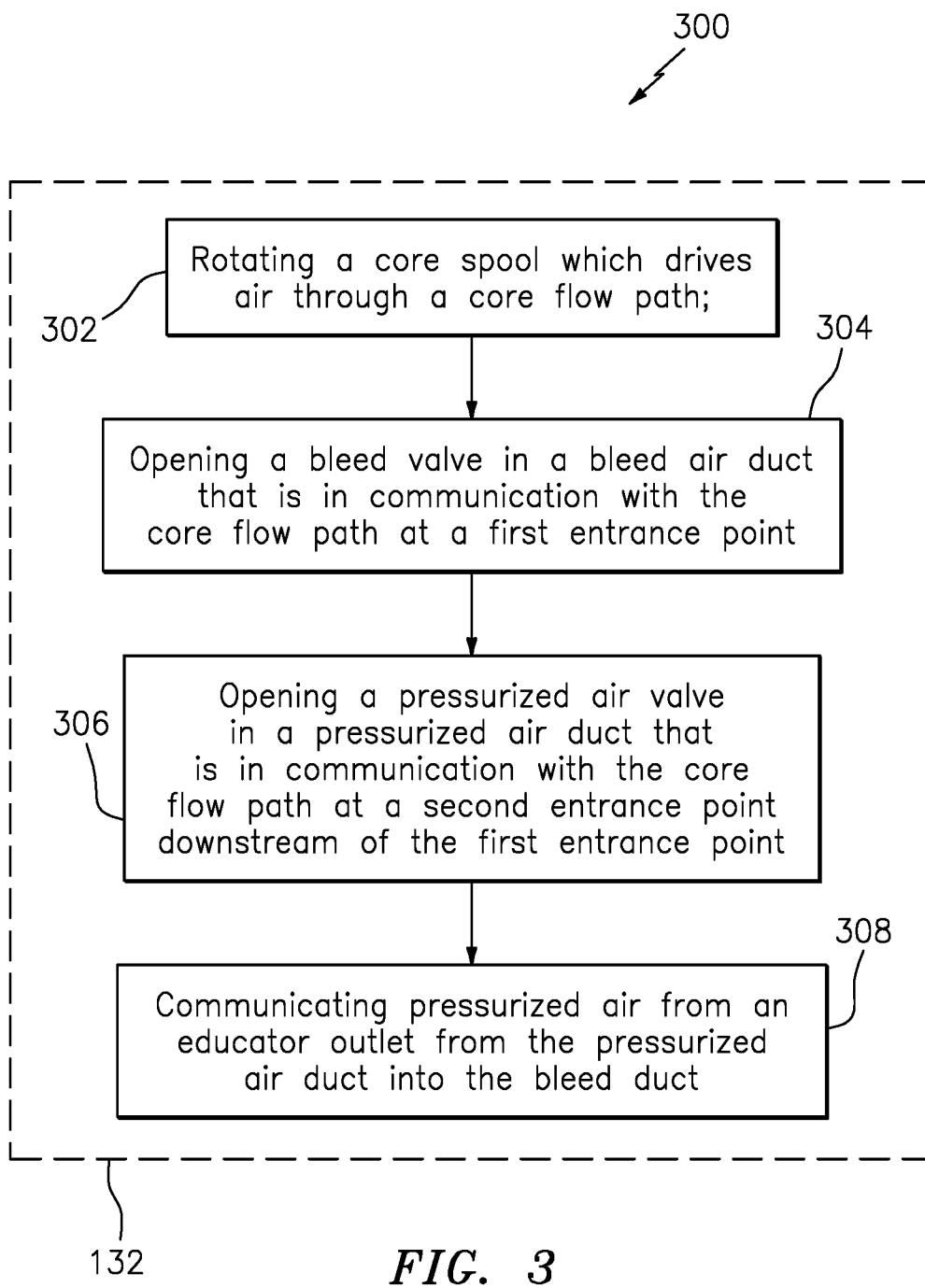
FIG. 3 is a block diagram representative of logic for the system.
Figure 5:
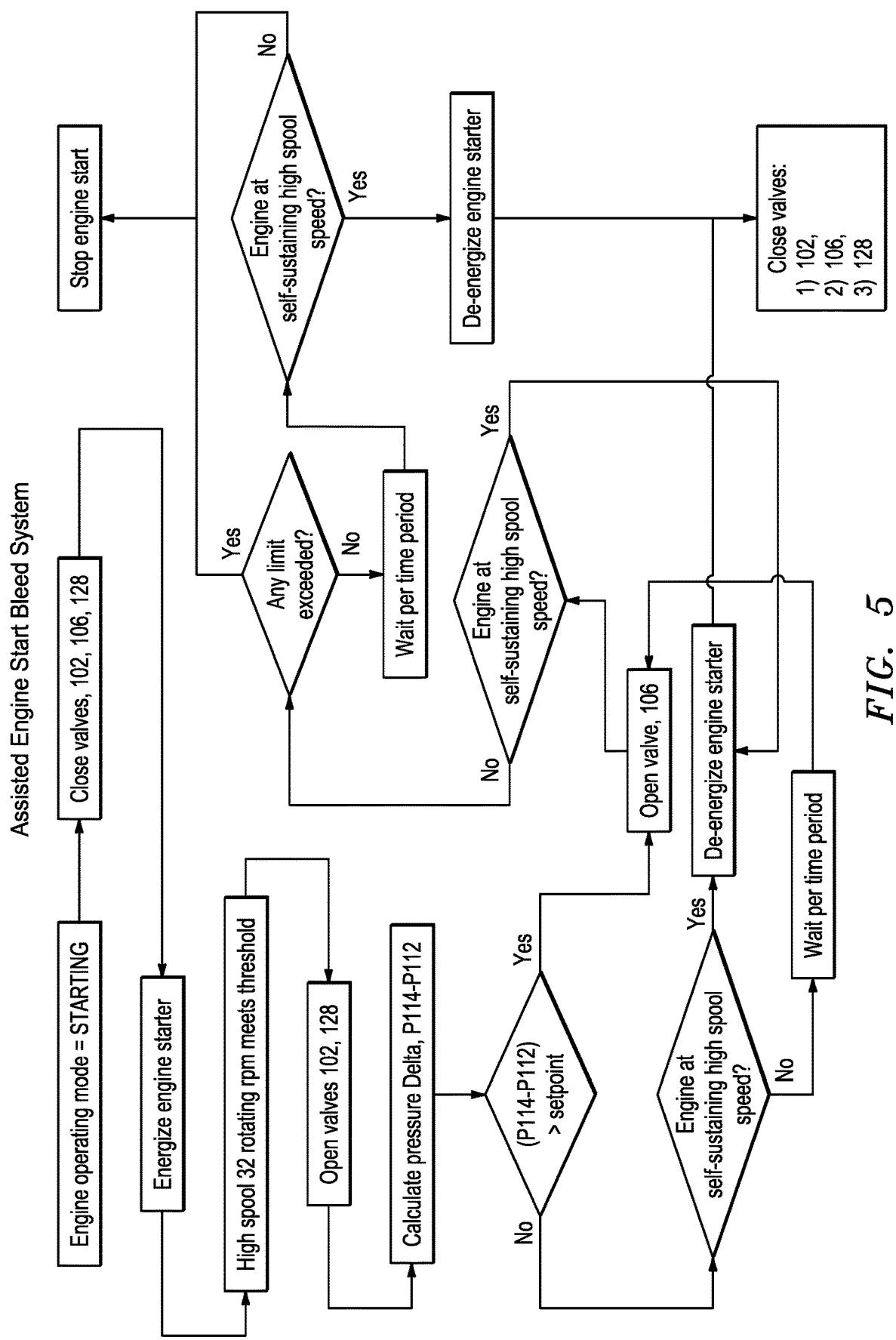
FIG. 5 is a block diagram representative of logic for the system.

With reference to FIGS. 3 and 5, a method 300 of starting a gas turbine engine is disclosed. Initially, the method 300 includes rotating the core spool (302), by a starter motor or the like. Next, the control module 130 opens the first entrance point to the core flow path C to direct bleed air (304) from the compressor section to reduce a pressure therein. Next, the control module 130 opens the pressurized air valve 106 (306) directing pressurized air from the higher pressure second entrance point 114 positioned downstream thereof into the eductor outlet 126 to facilitate flow through the bleed duct 104 (308). That is, the system 100 for bleeding air induces and entrains a higher rate of bleed flow from the mid-stage of the high pressure compressor and enables a faster start. Finally, the combustor is ignited once the core flow path compressor section and the core flow path turbine section have reached sufficient rotational velocity for start-up.

Figure 4:
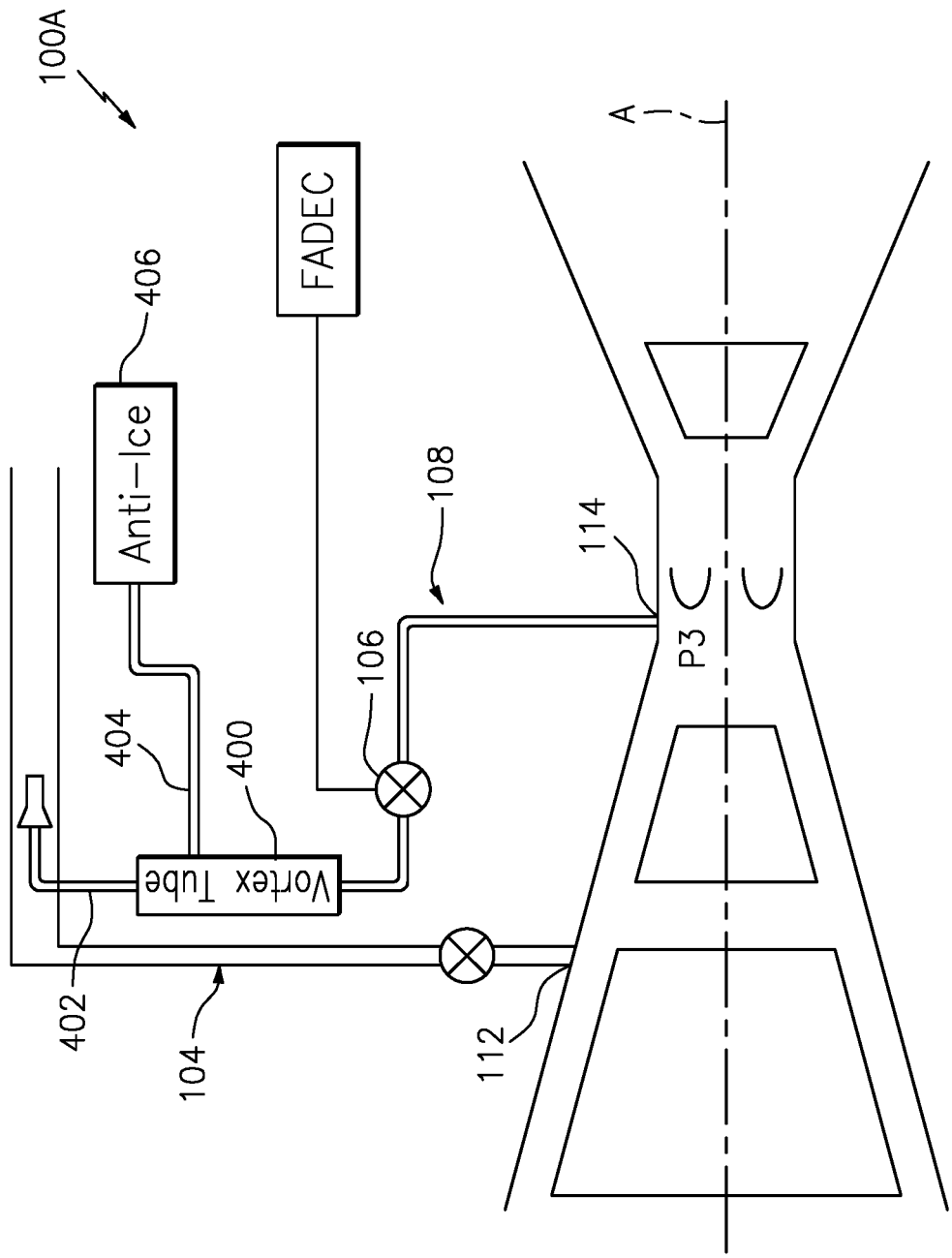
FIG. 4 is a schematic of a system for bleeding air from a core flow path of the gas turbine engine according to another disclosed non-limiting embodiment.

With reference to FIG. 4, another embodiment of the system 100A includes a vortex tube 400 in the pressurized air duct 108 downstream of the pressurized air valve 106. The vortex tube 400 may be a mechanical device that separates the compressed gas into a relatively cold, high density flow 402 into the bleed duct 104 and a relatively hot, low density flow 404 into, for example, an anti-ice system 406.

The system enables a stable sub-idle initial condition of air flow rate during engine starting, especially for starting very high pressure ratio high pressure compressors. The system is also passive and reduces mechanical complexity by avoiding auxiliary rotating turbomachinery and gearing.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein; however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed:

1. A system for bleeding air from a core flow path of a gas turbine engine, comprising: a bleed valve in a bleed air duct configured to receive bleed air from a first entrance point to the core flow path into the bleed air duct; a pressurized air valve in a pressurized air duct configured to receive pressurized air from a second entrance point to the core flow path, the pressurized air at a pressure greater than that received into the first entrance point, wherein the bleed air duct is of a larger diameter than the pressurized air duct; an eductor outlet from the pressurized air duct located in the bleed air duct, wherein the bleed air duct extends along a linear bleed air flow path, and wherein at least a portion of the pressurized air duct and the eductor are positioned within the bleed air duct along the linear bleed air flow path; and a control system operable to control operation of the bleed valve and the pressurized air valve, and a pressure throttling valve in the bleed air duct downstream of the eductor valve.

2. The system as recited in claim 1, wherein the control system is a FADEC.

3. The system as recited in claim 1, wherein the first entrance point is positioned proximate a compressor section of the gas turbine engine.

4. The system as recited in claim 1, wherein the first entrance point is positioned proximate a low pressure compressor section of the gas turbine engine.

5. The system as recited in claim 1, wherein the first entrance point is positioned upstream of a low pressure compressor section of the gas turbine engine.

6. The system as recited in claim 1, wherein the second entrance point is positioned proximate a high pressure compressor section of the gas turbine engine.

7. The system as recited in claim 1, wherein the second entrance point is positioned downstream of a high pressure compressor section of the gas turbine engine.

8. The system as recited in claim 1, wherein the second entrance point is positioned proximate an outer annular plenum of a combustor section within the gas turbine engine.

9. The system as recited in claim 1, further comprising a vortex tube in communication with the pressurized air duct.

10. The system as recited in claim 9, wherein the vortex tube divides pressurized air from the pressurized air duct into a relatively hot flow and a relatively cold flow, wherein the relatively cold flow is conveyed to the eductor, and further comprising an anti-ice system in communication with the vortex tube to receive the relatively hot flow.

11. A gas turbine engine, comprising: a core flow path extending through the gas turbine engine; a bleed valve in a bleed air duct configured to receive bleed air from a first entrance point proximate a low pressure compressor section in the core flow path into the bleed air duct; a pressurized air valve in a pressurized air duct configured to receive pressurized air from a second entrance point proximate to a high pressure compressor section in the core flow path, the pressurized air at a pressure greater than that received into the first entrance point, wherein the bleed air duct is of a larger diameter than the pressurized air duct; an eductor outlet from the pressurized air duct located in the bleed air duct, wherein the bleed air duct extends along a linear bleed air flow path, and wherein at least a portion of the pressurized air duct and the eductor are positioned within the bleed air duct along the linear bleed air flow path; and a control system operable to control operation of the bleed valve and the pressurized air valve, and a pressure throttling valve in the bleed air duct downstream of the eductor valve.

12. The gas turbine engine as recited in claim 11, further comprising a vortex tube in communication with the pressurized air duct, wherein the vortex tube divides pressurized air from the pressurized air duct into a relatively hot flow and a relatively cold flow, wherein the relatively cold flow is conveyed to the eductor, and further comprising an anti-ice system in communication with the vortex tube to receive the relatively hot flow.

13. A method for starting a gas turbine engine comprising: rotating a core spool which drives air through a core flow path; opening a bleed valve in a bleed air duct that is in communication with the core flow path at a first entrance point whereby a bleed air flow flows through the bleed air duct; opening a pressurized air valve in a pressurized air duct that is in communication with the core flow path at a second entrance point downstream of the first entrance point; opening a pressure throttling valve in the bleed air duct downstream of the eductor valve; and communicating pressurized air from the pressurized air duct to an eductor outlet in the bleed air duct, wherein the bleed air duct defines a linear bleed flow path, and wherein at least a portion of the pressurized air duct and the eductor outlet are positioned and axially fixed within the bleed air duct and along the linear bleed flow path, whereby the pressurized air from the pressurized air duct flows through the eductor into the bleed air flow in the bleed air duct.

14. The method as recited in claim 13, further comprising communicating the pressurized air through a vortex tube in communication with the pressurized air duct to divide pressurized air from the pressurized air duct into a relatively hot flow and a relatively cold flow.

15. The method as recited in claim 14, wherein the relatively cold flow is conveyed to the eductor, and further comprising communicating airflow from the vortex tube to an anti-ice system to receive the relatively hot flow.

16. The method as recited in claim 13, wherein the first entrance point is positioned upstream of a low pressure compressor section of the gas turbine engine.

17. The method as recited in claim 16, wherein the second entrance point is positioned proximate a high pressure compressor section of the gas turbine engine.

18. The method as recited in claim 13, wherein the second entrance point is positioned proximate an outer annular plenum of a combustor section within the gas turbine engine.

* * * * *